United States Patent

[11] 3,616,269

| [72] | Inventors | David Aelony;<br>William J. McKillip, both of Minneapolis, Minn. |
|---|---|---|
| [21] | Appl. No. | 840,837 |
| [22] | Filed | July 10, 1969 |
| [45] | Patented | Oct. 26, 1971 |
| [73] | Assignee | Ashland Oil, Inc.<br>Houston, Tex. |

[54] METHOD FOR THE PURIFICATION OF MALONONITRILE BY THE ADDITION OF CYCLOPENTADIENE FOLLOWED BY DISTILLATION
5 Claims, No Drawings

| [52] | U.S. Cl. | 203/38, 203/68, 203/74, 260/465.8 |
|---|---|---|
| [51] | Int. Cl. | C07c 121/22 |
| [50] | Field of Search | 203/38, 68, 74, 81; 260/465.8 |

[56] References Cited
UNITED STATES PATENTS

| 2,264,354 | 12/1941 | Alder et al. | 360/465.8 |
|---|---|---|---|
| 2,553,406 | 5/1951 | Dixon | 260/465.8 |
| 2,799,697 | 7/1957 | Maxion | 260/465.8 |
| 2,809,986 | 10/1957 | Flisik et al. | 260/465.8 |
| 2,826,537 | 3/1958 | Sharp et al. | 203/38 |
| 3,313,840 | 4/1967 | Kosel et al. | 260/465.8 |
| 3,502,709 | 3/1970 | Morita et al. | 260/465.8 |

*Primary Examiner*—Wilbur L. Bascomb, Jr.
*Attorneys*—William Kammerer and Larry W. Evans ABSTRACT: Malononitrile containing similarly boiling unsaturated dinitrile impurities is contacted with cyclopentadiene to result in the selective conversion of said impurities to substantially higher boiling derivatives thereof thereby permitting the ready recovery of a purified fraction of malononitrile by distillation.

METHOD FOR THE PURIFICATION OF MALONONITRILE BY THE ADDITION OF CYCLOPENTADIENE FOLLOWED BY DISTILLATION

BACKGROUND OF THE INVENTION

1. Field of the Invention

This invention relates to the production of malononitrile and more specifically to a method for the purification thereof.

2. Description of the Prior Art

It has hitherto been proposed to prepare malononitrile by the high-temperature vapor phase reaction of either hydrogen cyanide or cyanogen chloride with a stoichiometrical excess of acetonitrile. In the practice of either of these methods, unsaturated dinitrile byproducts are produced. While the use of cyanogen chloride in the foregoing manner results in a higher selectivity toward the formation of malononitrile, and thus represents the preferred approach for this reason, the method is very difficult to implement so as to provide an essentially pure product. This is so because the attendant dinitrile byproducts exhibit boiling characteristics closely related to that of malononitrile.

The prior art has proposed the use of a crystallization technique for fractioning a crude source of malononitrile obtained by dehydrating cyanoacetamide. However, the applicability of such a fractionation process appears essentially limited to the treatment of a crude malononitrile produced in the manner indicated. Moreover, fractionation of complex reaction mixtures by crystallization is invariably an inefficient operation and one which is tedious to accomplish on a commercial scale.

Thermal fractionation of crude malononitrile, notwithstanding indications in the prior art to the contrary, can actually be carried out in a large scale operation with relative ease. But where the crude contains similarly boiling contaminants in the form of unsaturated dinitrile products, relatively complete purification by this means is not practicable. In the practice of this invention, a way is provided for obtaining a pure grade of malononitrile from a source thereof containing said contaminants utilizing a thermal distillation procedure not requiring sophisticated distillation equipment.

SUMMARY OF THE INVENTION

In accordance with the present invention, malononitrile or a crude source thereof containing similarly boiling dienophile byproducts is contacted with cyclopentadiene to result in the selective conversion of said byproducts to substantially higher boiling derivatives thereof; whereupon, the treated product is thermally distilled to provide a fraction of malononitrile having a substantially reduced content of the dienophiles.

Since the byproducts associated with the malononitrile in the context of this invention have in common ethylenic unsaturation capable of undergoing the Diels-Alder reaction with cyclopentadiene to form adduction products, they are collectively referred to herein as dienophiles. While it is not beyond expectation that the resultant adducts would exhibit substantially different boiling characteristics than the dienophile from whence derived, the unusual degree of thermal stability toward retrogradation exhibited thereby was on the other hand most surprising. In this connection, it has been found that such derivatives remain intact up to the temperature which malononitrile distills under ambient pressure conditions. Thus, complete versatility is afforded with respect to pressure conditions applicable in carrying out the distillation of malononitrile in effecting the purification thereof in accordance with this invention. Moreover, the presence of the Diels-Alder derivatives in the distillation residue adds greatly to the fluidity of the pitch, thus preventing the residue from developing into an intractable solid polymer. This property thus provides a process advantage for disposing of distillation bottoms.

DESCRIPTION OF THE PREFERRED EMBODIMENTS

As mentioned hereinabove, a commercially attractive method for the production of malononitrile consists of reacting cyanogen chloride with a stoichiometric excess of acetonitrile in the vapor phase. Good yields of malononitrile are readily realized if one observes a reaction temperature in the range of about 700° to 800° C. Moreover, this method provides a high selectivity toward malononitrile; namely, in the order of about 0.9. The principal byproducts occurring in the reaction consists essentially of a mixture of fumaronitrile and maleonitrile, same being formed in a relative proportion of approximately 2 to 1; respectively. The present invention will accordingly be described and illustrated in light of this method for the preparation of malononitrile.

In accordance with this invention, two principal ways exist for the purification of the foregoing malononitrile products. In the practice of either way, it is preferably to treat the crude product initially with an alkaline earth oxide; e.g., a magnesium oxide, to neutralize acidic components. One of the aforementioned modes involves adding cyclopentadiene to the crude to effect adduction of the dienophile content thereof. At least a stoichiometric amount of the cyclopentadiene should be used. However, to facilitate adduction efficiency an excess of cyclopentadiene can be used. Thus, amounts of the cyclopentadiene up to 20 times that theoretically needed to adduct the dienophiles can be used. Large excesses of the cyclopentadiene are particularly desirable in following this particular mode of operation inasmuch as the presence thereof further facilitates the handling properties of the tarry bottoms occurring in the distillation step.

In accomplishing the adduction of the dienophiles, the crude can be diluted with an applicable solvent such as a lower alkanol, specifically, ethanol. However, the presence of a solvent does not substantially enhance the adduction process in this instance. The adduction is preferably accomplished at an ambient temperature. Higher temperatures up to approximately that of the boiling point of the lowest boiling component of the treated crude can be used if desired. Treating time is not critical; several hours being more than ample to effect adduction of the dienophiles. Following contacting with cyclopentadiene in the foregoing manner, the crude can then be distilled to recover a malanonitrile fraction having a substantially reduced content of dienophiles.

An alternate procedure for purifying malononitrile in accordance with this invention consists of initially distilling the crude to recover the malononitrile content thereof. The resultant fraction will contain essentially all of the dienophiles associated with the malononitriles in the crude. Next, in the practice of this embodiment, the malononitrile fraction is treated with cyclopentadiene to effect adduction of the dienophile content. The adduction can be carried out in the presence or absence of a solvent as discussed in connection with the treatment of the crude in this manner. Likewise, the amount of cyclopentadiene to the dienophile content can vary from about the stoichiometric proportion to a tenfold excess. Treating the malononitrile fraction in the foregoing manner will result in a reduction of the dienophile content upon distillation to about 3 percent. The recovered fraction can then be treated again with cyclopentadiene and redistilled to result in a further lowering of the dienophile content. Two, or at most three, sequences of this type ordinarily suffice to accomplish almost substantially complete purification of the malononitrile.

The following working examples in which all parts are parts by weight unless other wise indicated, will further illustrate to those skilled in the art the best mode contemplated for carrying out the present invention.

EXAMPLE I

A sample of crude malononitrile which according to chromographic analysis (GLC) contained 56.3 percent malononitrile, 7.7 percent fumaronitrile and 3.9 percent maleonitrile was dissolved in 800 milliliters of absolute alcohol. The crude malononitrile employed in this example was prepared by reacting cyanogen chloride with a stoichiometric excess of acetonitrile at a temperature in the order of about 750° C. The alcoholic solution was thereupon treated with 37.4 grams of freshly distilled cyclopentadiene representing a 27 percent excess thereof over that required for adducting the fumaronitrile and malononitrile contents of the crude. The treated mixture was allowed to stand overnight, followed by distillation. About 400 milliliters of solvent was collected by distillation at ambient pressure. The balance of the solvent was evaporated in a rotary evaporator at 70° C. at about 20 mm. Distillation was further carried out in high vacuo on a rotary evaporator until the appearance of a yellow color in the tube. At this point, bath temperature was 110° C., pressure 200 μ. The distilled product according to nuclear magnetic resonance (NMR) analysis contained 96.1 wt. percent malononitrile and 3.9 wt. percent fumaronitrile and malononitrile.

EXAMPLE II

A sample of crude malononitrile prepared as describe in example I and containing approximately the same analysis of malononitrile and dienophiles was preliminarily distilled to provide a distillate containing 90.45 wt. percent malononitrile, 5.76 wt. percent fumaronitrile and 3.79 wt. percent maleonitrile. 25 parts of the distilled crude was dissolved in 80 parts of absolute alcohol and treated at 20° C. with 2 parts of freshly distilled cyclopentadiene representing the theoretical amount required to adduct the dienophile content of the distilled crude. The treated distillate was thereupon evaporated on stream bath to half its volume, then in vacuo on a rotary evaporator to result in a residue of 25.1 parts. The residue was permitted to stand overnight and then distilled in high vacuo through a Claisen head. The distillation commenced at 45° C., 70 μ (bath temperature 70° C.). Distillate in the amount of 19.78 parts was obtained. NMR analysis thereof indicated its composition to be 97.7 wt. percent malononitrile, 1.29 wt. percent fumaronitrile and 1.01 wt. percent malononitrile. Treatment in accordance with the procedure of this example lowered the fumaro-malononitrile content by 75 percent.

EXAMPLE III

A sample of crude malononitrile similar to that described in example I was stripped of excess acetonitrile and distilled up to 120° C. at about 1 mm. to provide a distillate analyzing 87.03 wt. percent malononitrile, 8.22 wt. percent fumaronitrile and 4.75 wt. percent maleonitrile. 259 parts of the distillate was then treated with 33.5 parts cyclopentadiene, and thereupon allowed to stand 1 hour and then distilled to a point where 65.3 parts of residue remained. By NMR analysis, the distillate sample contained 99.3 wt. percent malononitrile and 0.7 wt. percent of fumaronitrile and malononitrile.

EXAMPLE IV 200 parts of a malononitrile crude product similar to that described in example I and analyzing 63.2 wt. percent malononitrile, 7.1 percent maleonitrile and fumaronitrile and 24.0 wt. percent acetonitrile was treated with 16.1 parts of freshly distilled cyclopentadiene. The addition of the cyclopentadiene was accomplished at room temperature and the treated mixture subsequently exothermed to 54° C. The treated material was allowed to stand 30 minutes and then distilled up to 120° C. (bath temperature) and at 5 mm. pressure on a rotary evaporator. 48 parts remained as residue. The distillate (155 parts) analyzed 36.2 wt. percent acetonitrile, 63.0 wt. percent malononitrile and 0.8 wt. percent fumaronitrile and malononitrile. The acetonitrile free material was calculated to be 98.7 wt. percent malononitrile and 1.3 wt. percent fumaro-maleonitrile.

EXAMPLE V 288 parts of purified malononitrile (the distillate product of example IV) was treated with 6 parts of freshly distilled cyclopentadiene. Following the addition of the cyclopentadiene at room temperature, the treated mixture was held for 20 minutes and thereupon stripped of acetonitrile and distilled to 120° C. (bath temperature) at about 1 mm. The distillate in the amount of 200 parts analyzed 99.69 wt. percent malononitrile and 0.31 wt. percent acetonitrile. No maleonitrile or fumaronitrile was detected by NMR analysis.

We claim:

1. A method for purifying malononitrile containing as contaminants similarly boiling dienophiles formed in the preparation thereof which comprises contacting the impure malononitrile with cyclopentadiene to effect adduction of said dienophiles and thereupon distilling the adduction reaction mixture to recover an overhead malononitrile fraction having a substantially reduced content of said dienophiles.

2. A method in accordance with claim 1 wherein said impure malononitrile is in the crude from thereof resulting from the reaction of acetonitrile and cyanogen chloride.

3. A method in accordance with claim 2 wherein the adduction of said crude malononitrile is effected at ambient temperature.

4. A method in accordance with claim 1 wherein said impure malononitrile consists essentially of malononitrile and said dienophiles.

5. A method in accordance with claim 4 wherein said dienophiles consist essentially of a mixture of fumaronitrile and maleonitrile.

* * * * *

Notice of Adverse Decision in Interference

In Interference No. 98,508, involving Patent No. 3,616,269, D. Aelony and W. J. McKillip, METHOD FOR THE PURIFICATION OF MALONONITRILE BY THE ADDITION OF CYCLOPENT-ADIENE FOLLOWED BY DISTILLATION, final judgment adverse to the patentees was rendered Oct. 22, 1976, as to claims 1, 2, 3, 4 and 5.

[*Official Gazette March 22, 1977.*]